United States Patent [19]

Gray, III et al.

[11] 4,322,450
[45] Mar. 30, 1982

[54] SURFACE REPLICATION ON A COATED SUBSTRATE

[75] Inventors: Lorin S. Gray, III, Portland; John A. Mattor, Bar Mills; Ben Millard, South Windham; Franklin J. Ward, Cape Elizabeth, all of Me.

[73] Assignee: Scott Paper Company, Philadelphia, Pa.

[21] Appl. No.: 193,068

[22] Filed: Oct. 2, 1980

Related U.S. Application Data

[63] Continuation-in-part of Ser. No. 78,078, Sep. 24, 1979.

[51] Int. Cl.³ .................................................. B05D 3/06
[52] U.S. Cl. ................................... 427/44; 427/54.1; 427/362
[58] Field of Search .................. 427/44, 54, 1, 362; 118/106, 110, 101, 102, 118, 119, 123, 620, 642, 643; 156/242, 245

[56] References Cited

U.S. PATENT DOCUMENTS

| | | | |
|---|---|---|---|
| 3,265,776 | 8/1966 | Henkes | 264/1 |
| 3,600,215 | 8/1971 | Mervine | 427/362 |
| 3,689,346 | 9/1972 | Rowland | 156/245 |
| 3,712,706 | 1/1973 | Stamm | 350/103 |
| 4,070,497 | 1/1978 | Wismer et al. | 427/44 |
| 4,177,310 | 12/1979 | Steeves | 427/44 |
| 4,177,314 | 12/1979 | Steeves | 427/44 |

FOREIGN PATENT DOCUMENTS

| | | |
|---|---|---|
| 9885 | 4/1980 | European Pat. Off. |
| 1519473 | 7/1978 | United Kingdom |
| 2019257 | 10/1979 | United Kingdom |

OTHER PUBLICATIONS

PSATY "1979 Paper, Synthetics Conference Proceedings", Tappi pp. 105-109 (1979).

*Primary Examiner*—John H. Newsome
*Attorney, Agent, or Firm*—R. Duke Vickrey; John W. Kane; Francis M. DiBiase

[57] ABSTRACT

Disclosed is a superior method of providing a desired surface effect in a release coating on a porous sheet-like substrate by applying a coating of an electron beam radiation curable composition or material directly to one side of a base coated paper web, pressing the coated side of the substrate against a replicative surface having the desired surface effect, irradiating the coating with electron beam radiation through the substrate to cure the coating at least sufficiently to permanently adhere it to the substrate and to enable it to be removed with the substrate from the replicative surface securely attached to the substrate and with the replicated surface effect in the coating bein maintained, the irradiation step taking place after sufficient time has passed to cause the coating to penetrate into the coated paper and to be in continuous intimate contact with the coated paper. Also disclosed is the apparatus for carrying out the method and the resulting product.

12 Claims, 1 Drawing Figure

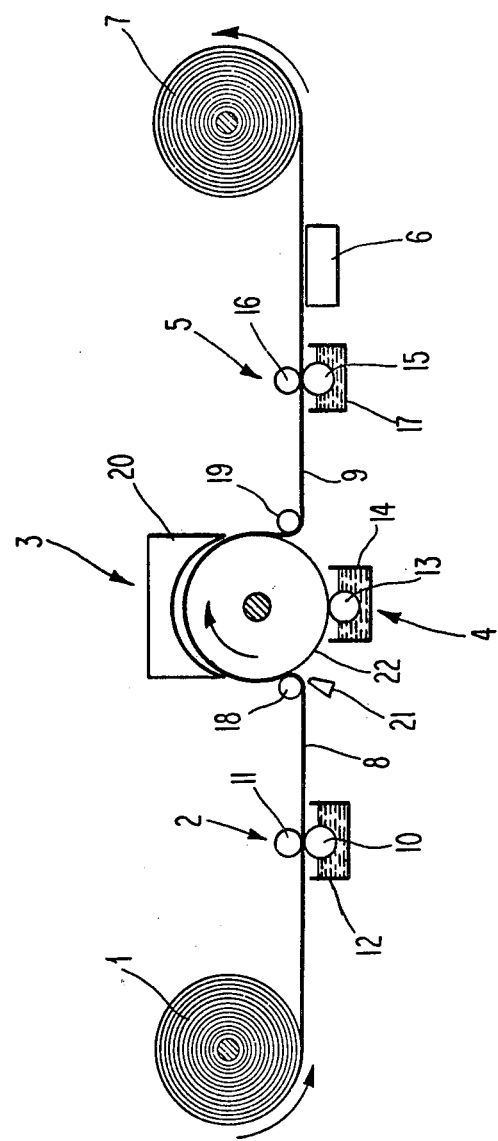

SURFACE REPLICATION ON A COATED SUBSTRATE

RELATED APPLICATION

This application is a Continuation-in-Part application of United States Ser. No. 78,078, filed Sept. 24, 1979.

TECHNICAL FIELD

The present invention relates to coatings for paper and other substrates, and particularly to release coatings which are characterized by their ability to separate intact from a surface which is normally adherent. More specifically, the invention relates to an apparatus and method for providing a desired surface effect in the release coating and to the release sheet product so produced.

BACKGROUND ART

A number of processes exist in which a plastic film or sheet is formed on or against a release sheet and then separated from the release sheet after taking steps, such as cooling or curing, to set the film or sheet. Curing, where necessary, may be accomplished by heat, by peroxide catalyst, or by U.V. radiation or by electron beam radiation. The release sheet provides a surface from which the set plastic material can be readily separated and imparts to the surface of the plastic material the quality of finish of the release surface. For example, a desired textured surface can be provided on the surface of the plastic material by forming on or against a release sheet having the mirror image of the desired textured surface.

One example of such forming processes is "casting", wherein a resinous material, such as polyvinyl chloride or polyurethane resin, in a flowable state is deposited or "cast" onto the release sheet surface, heated, cured and cooled to consolidate the resinous material into a continuous self-supporting film, and stripped from the support. The release sheet is normally provided with a desired surface effect, such as high gloss, texturing or an embossed configuration, and the surface effect is replicated on the cast film.

Another example of such forming processes is "panel pressing" of decorative plastic laminates, which can be either of the high pressure or low pressure type. In high pressure panel pressing, decorative laminates are conventionally prepared by assembling in a stacked relationship a plurality of core sheets, each of which is a web of paper impregnated with a resinous material, such as phenolic resin. Immediately positioned above the core sheet assembly is a decorative sheet, which is a resin saturated sheet having a solid color or a suitable design thereon. Superimposed above the decorative sheet is generally an overlay sheet which is a thin sheet of fine paper impregnated with a noble thermosetting resin, such as a melamine formaldehyde resin or an unsaturated polyester resin and the like (and is generally the same resin used to impregnate the decorative sheet). The entire assembly of core sheets, decorative sheet, and overlay sheet is placed between platens in a press and consolidated by application of heat and pressure. Generally, a release sheet having the desired surface effect to be reproduced in the surface of the overlay sheet is placed against the overlay sheet during pressing. High pressure laminates after being consolidated are usually further glued to a structural substrate, such as particle board or plywood. Low pressure panel pressed decorative laminates are made in a similar manner to high pressure laminates, but generally involve lamination of the decorative sheet directly to particle board or other structural substrate.

Other pressing processes where a plastic film or sheet is formed on or against a release sheet may not include the lamination step, but only texturing a moldable plastic surface which is already laminated. For example, a plastic film could be coated directly into particle board or plywood and then textured by pressing against a release sheet having the desired textured pattern in its surface. (See, for example, U.S. Pat. No. 4,113,894 to Koch).

Other uses for release sheets include heat transferable printed designs and pressure sensitive adhesive coated webs. The heat transferable printed designs are printed on the release sheet with a polyvinyl chloride plastisol ink or offset printing ink and overcoated with a polyvinyl chloride plastisol. When placed against a receptive surface, such as a T-shirt, and heated, the printed design and overlayer are transferred to the receptive surface. On the other hand, pressure sensitive coated webs are typically adhesive coated tapes, labels or decals and the like which are attached to a release surface for easy removal when it is desired to permanently attach them. The release surface must permit temporary attachment of the pressure sensitive adhesive, but also permit easy removal.

Other uses of release sheets similar to the panel pressing area include use as an interleaver between groups of laminae pressed at the same time in back to back configuration to form two distinct decorative laminates. The release sheet in this case separates the laminates from each other and thereby permits more than one to be pressed at the same time between the same platens. (See, for example, U.S. Pat. No. 4,030,955 to Antonio et al.)

Release sheets are typically made by coating, treating, or impregnating a paper sheet or other substrate with a release coating of such materials as polymethylpentene, polypropylene, polyfluorocarbons, silicone oil, thermoset silicone resins, and other conventional release agents. Surface effects on the release sheet are conventionally provided by any of a number of techniques. The release coating can be dried to a smooth surface gloss, or surface effects such as texturing or embossing can be provided in the coating by mechanical means, applied either to the surface of the paper before coating or to the paper after the coating is applied. Another technique employed for producing a release coating with a textured surface is to extrude a molten thermoplastic film such as polypropylene or polymethypentene, onto a paper surface, cool it and then pass it between matched steel embossing rolls. In all cases a satisfactory release paper must have its release coating securely adhered to the substrate so that it will remain with the substrate when the sheet or film formed on or against it is stripped.

One disadvantage of these techniques is that the pattern of the embossing rolls or other mechanical means is not completely replicated in the surface of the release coating. That is, the entire embossure depth of the embossing rolls or other mechanical means is not reproduced in the release coating, often providing only about 60% actual replication. This shortcoming is particularly acute in producing fine patterns such as wood grain or leather grain, where the finer parts of the pattern can be lost in the replication process. In addition, the embossing rolls are limited in speed, some processes running as slow as 30 feet per minute.

DISCLOSURE OF THE INVENTION

A superior method of providing a desired surface effect in a release coating on a substrate is provided by the present invention, which in its broadest sense, comprises the steps of:

A. applying a coating of an electron beam radiation curable composition or material directly to one side of a web of base coated paper;

B. pressing the coated side of the substrate against a replicative surface having a desired surface effect to cause the surface of the coating to conform to the replicative surface;

C. irradiating the coating with electron beam radiation through the substrate to cure the coating at least sufficiently to enable it to be removed from the replicative surface securely attached to the substrate and with the replicated surface effect in the coating being maintained, the irradiation step taking place after sufficient time has passed for the coating to penetrate into the coated paper and to be in continuous intimate contact with the coated paper; and D. stripping the substrate from the replicative surface with the at least partially cured coating adhered to the substrate.

The apparatus of the invention in its broadest sense comprises:

A. a replicative surface having a desired surface effect and being provided by an endless surface mounted for revolution;

B. coating means for applying a coating of an electron beam radiation curable composition of material directly to one side of a substrate;

C. pressing means for pressing the coated side of the substrate against the reeplicative surface to cause the surface of the coating opposite the substrate to conform to the replicative surface;

D. electron beam radiation means for irradiating the coating through the substrate to cure the coating at least sufficiently to enable it to be removed from the replicative surface securely attached to the substrate and with the replicated surface effect in the coating being maintained; and E. means for stripping the substrate from the replicative surface with the at least partially cured coating adhered to the substrate.

The replicative surface is preferably provided by a roll, drum, or other cylindrical surface, which can be revolved past an electron beam curing device. The coating is applied directly to the substrate, which is preferably paper, before the paper engages the roll. In one embodiment an after-coating is applied to the first coating after it is partially cured and removed from the replicative surface and then curing of the first coating is finished along with curing of the after-coating.

The replicative surface is preferably a metal roll with a texture or embossure engraved in its surface, but it can also have other surface effects, such as a highly polished surface. One of the most important advantages of the invention is that the texture, embossure or other finish of the replicative surface is essentially one hundred percent reproduced in the cured coating. This achievement cannot be provided by any prior art technique, and it enables replication of very fine patterns in the release paper such as wood grain and leather grain.

Also, electron beam radiation can penetrate opaque substrates such as paper and deeply into thick coatings. Other forms of radiation curing such as U.V. radiation can only penetrate optically clear substrates and not into thick coatings.

Another of the most important advantages of the invention is that the coating penetrates the coated paper substrate and adheres sufficiently to permit the coated substrates to perform as a release paper. That is, the electron beam cured coating will remain securely attached to the substrate when a sheet or film formed on or against the release coating is stripped from it. In order to perform satisfactorily as a release coating the coating must be in continuous intimate contact with the coated paper. No spaces or voids between the coating and paper can be permitted. The critical elements of the invention which provide this advantage are coating the electron beam curable composition directly to the substrate, the substrate having the proper porosity, and permitting sufficient time between coating and curing to permit the coating to penetrate the substrate.

The substrate is provided by coated paper which has an air porosity of at least 0.08 cc./min./cm$^2$ under an air pressure of 10 kPa (1.5 p.s.i.). The amount of time preferred between coating and curing is at least one second. The coating viscosity affects the penetration to some extent, but within the preferred range of less than 1300 centipoise is not critical.

Another advantage of the invention is that the release paper can be produced at much higher line speeds than by some of the prior art techniques. Electron beam curing is almost instantaneous. Furthermore, in conventional mechanical embossing, the degree of replication is usually inversely proportional to line speed, thereby resulting in a disadvantage to fast running. The present invention is not so affected.

The invention is also the release sheet produced by the method of the invention. The release sheet is distinctive in its degree of surface effect replications, as a result of having been electron beam cured through the substrate while the coating was in contact with a replication surface, and the attachment of the cured coating to the substrate due it having penetrated the coated paper and being in continuous intimate contact with the coated paper.

BRIEF DESCRIPTION OF THE DRAWING

The FIGURE illustrates schematically the preferred apparatus for carrying out the present invention. The FIGURE shows a base paper substrate and (optionally) an engraved roll being coated with an electron beam curable composition, after which the paper, coating and roll are revolved together past an electron beam curing station where the coating is cured, and then the paper, with the cured coating adhered to it, is stripped from the roll.

BEST MODE FOR CARRYING OUT THE INVENTION

Referring to the FIGURE, a roll 1 of base paper is unwound and passed through the following: a pre-coating station 2; an electron beam curing station 3, along with an optional coating station 4; an after-coating station 5; and an after curing station 6, from where it is wound onto roll 7. The pre-coating station 2 is provided by coating roll 10 and backup roll 11 positioned to form a nip through which the paper 8 passes. Coating roll 10 rotates through reservoir 12 of the coating material and transfers a predetermined layer of coating material to one side of paper 8.

Optional coating station 4 is provided by coating roll 13 mounted for rotation in reservoir 14 of coating material and against engraved roll 22. The coating roll 13 transfers a predetermined layer of coating material to the engraved roll 22. The coating station 4 would be used when it is desirable to apply coating material at both stations, for example when a heavier coating is desired or when different coating compositions in a layered arrangement are desired. It can also be located upstream from the engraved roll 22 where it coats a second coat directly on the first coat, and this would be desirable in most cases for the reasons set forth later.

The above-described coating apparatus is preferred, but any of the conventional coating apparatus, such as knife-over-roll, offset gravure, reverse roll, etc., can be used.

The after-coating station 5 is also optional and would only be used when it is desired to put a top coat over the coating composition already on coated paper 9 which is already at least partially cured. The after-coating station 5, in similar manner to the pre-coating station 2, can be provided by coating roll 15 which forms a nip with backing roll 16 and is rotatably mounted in reservoir 17 of coating material. When the after-coating station 5 is employed, at least pre-coating station 2 is also used and the first coating is at least partially cured at the electron beam curing station 3. Preferably, the first coating is only partially cured at curing station 3 and then finished cured at the after-curing station 6 along with the second coating. This provides better adherence of the second coating to the first. A second electron beam curing unit 6 is preferably employed for the after-curing station, but other forms of curing might also be useful for some coating forumlas.

The replicative surface is provided by roll 22, in which the desired texture is engraved in the surface. The paper 8 is pressed against the roll 22 by press roll 18 to assure that the coating fills the depressions in the textured surface of the roll 22 and that there is continuous intimate contact with the paper. The roll 22 is mounted for rotation by conventional drive means (not shown) and continuously carries the paper and coating past the electron beam radiation unit 20 which irradiates the coating through the paper and cures it at least sufficiently to permit it to be removed from the roll 22 at take-off roll 19, securely attached to the paper 9, and to assure permanent replication of the desired surface. The irradiation step takes place after sufficient time has passed for the coating to penetrate into the pores of the substrate, a process element which is further facilitated by coating directly to the substrate.

The amount of coating applied to the substrate and/or replicative surface can be varied somewhat, depending upon the surface effect and pattern depth on the replicative surface. The coating is spread by the pressure of the press roll 18 and fills the contours of the replicative surface while providing a continuous layer on the substrate. The amount of coating will typically range from about 22.2 grams to about 44.4 grams per square meter (15-30 lbs. per ream of 3300 square feet) for a contoured surface, but for a smooth replicative surface it could be as little as about 5 grams per square meter.

If the replication pattern contours are to be reproduced in the coating only and not also in the paper substrate, the coating must be sufficiently thick to permit this. If the pattern contours are to be reproduced in the paper also, less coating can be used and higher pressure and a harder press roll 18 would be used.

Electron beam radiation units useful in the present invention are readily available and typically consist of a transformer capable of stepping up line voltage and an elctron accelerator. In one type of machine the electrons are generated from a point source filament and then scanned electromagnetically like a television set to traverse the coated object. In another type of machine, the electrons are generated in a curtain from an extended filament which can irradiate the entire width of the surface without the need for scanning. While commercial machines are available with accelerating voltages of over a million electron volts, the range for this and similar coating applications is typically from 150-300 KV (kiloelectron volts). It is common when curing coatings with electron beam radiation units to take steps to eliminate oxygen from the surface of the coating. In the present apparatus, a nitrogen atmosphere is applied through nozzle 21.

The coating applied to the paper must be capable of being cured by electron beam radiation. Typical resins usefil in electronbeam curable coatings are styrenated polyesters and acrylics, such as vinyl copolymers of various monomers and glycidyl methacrylate reacted with acrylic acid, isocyanate prepolymers reacted with an hydroxyalkyl acrylate, epoxy resins reacted with acrylic or methacrylic acid, and hydroxyalkyl acrylate reacted with an anhydride and subsequently reacted with an epoxy. In some cases it may be desirable to include small amounts of conventional release agents, such as silicone oils.

Coating compositions which can be cured by electron-beam radiation and are suitable for release functions generally include some or all of the following:

(a) a moderate molecular weight (300 to 800 g./mole) functional oligomer;

(b) a reactive monomer diluent (a mono or multifunctional acrylate or methacrylate) such as trimethylolpropane triacrylate or isodecyl acrylate;

(c) pigments or fillers such as clay, silica or diatomaceous earth;

(d) reactive or non-reactive silicones; and (e) organic diluents such as acetone or carbon tetrachloride.

Although surface replication is outstanding when practicing the simplest form of the present invention, the release properties of the coating are generally better when the outer surface of the release coating is cured out of contact with the replication surface. Accordingly, the embodiment of the present invention described above with respect to after-curing station 6 provides the ability to balance these two properties, release and replication, to develop the best combination of both. A light coating of electron beam radiation curable material is applied by after-coating station 5 over the coated and at least partially cured product 9 and cured by after-curing unit 6. Some degree of replication is lost, but the release properties are improved. After-curing is preferably done in a non-oxygen atmosphere. This can be accomplished by providing a nitrogen (or other inert gas) atmosphere between the paper and the after-curing unit 6 by such conventional means as a nozzle exhausting nitrogen against the coating as it enters the after-curing unit. The particular coating formula employed for the top coating is preferably the same as that used for the principle coating, but in some cases it may be a different compatible coating material.

The following examples illustrate preferred formulas and preferred embodiments of the invention. Examples I and II are included to show the surface effect replication possible through use of curing a coating against a replicative surface and the subsequent use of the product so produced as a r eelease paper.

EXAMPLE I

A coating composition was prepared from:
isodecyl acrylate—5 parts, by weight
trimethylolpropane triacrylate—2 parts, by weight
phenoxyethyl acrylate—5 parts, by weight The composition was coated on an embossed aluminum plate and a paper web was pressed against the coating. The paper web was of the type conventionally used for the base of casting grade release paper and had a conventional pigment/binder base coat to improve holdup of the release coating. The coating was cured by electron-beam radiation through the paper with a dosage of 6 megarads and then the paper and coating were stripped from the plate.

EXAMPLE II

A coating composition was prepared from:
DOW Oligomer XD-9016–5 parts, by weight
isodecyl acrylate—5 parts, by weight
phenoxyethyl acrylate—5 parts, by weight
trimethylolpropane triacrylate—2 parts, by weight
The composition was coated, cured and stripped as in example I, except that the curing dose was 8 megarads.

The release papers produced in Examples I and II both had the embossed pattern of the aluminum plate replicated on their surfaces with essentially perfect reproduction. The pattern was only in the coating and not reproduced in the paper substrate, which remained flat. To test their release characteristics, a theremoplastic polyester urethane was cast onto them, dried at 100° C. in a non-circulating air oven for 1-½ minutes and cured at 160° C. in an air circulating oven for 1-½ minutes to form a 25.4 microns (1 mil) thick film. The film was then stripped from the release surface in an Osgood-Sutermeister release tester, which provides a comparative measurement of the energy required to strip a sample of the cured film 3.8 cm.×7.7 cm. from the release paper. Any release surface which permits stripping of the film with less energy than 47 Joules per square meter is considered satisfactory, and below 35 $J./m.^2$ is preferable. The film was stripped from the release paper of Example I with 18.7 $J./m.^2$ (16 g.s.i.) and from the release paper of Example II with 26.9 $J./m.^2$ In both cases the surface of the film exhibited the surface effect of the release surface.

The coating formula of Example I was varied to add 5 parts by weight of calcium carbonate pigment in one case and 10 parts by weight in another case, and the urethane film was stripped with 18.7 $J./m.^2$ and 25.7 $J./m.^2$, respectively. The coating formula of Example II was modified by adding 2 parts by weight of a reactive carbinol functional silicone (Down Corning Corp. 1248 silicone fluid), which permitted the urethane film to be stripped with 15.2 $J./m.^2$. This latter variation of Example II was also used to cast a film of polyvinyl chloride plastisol, which after drying was stripped with 11.7 $J./m.^2$. The polyvinyl chloride plastisol was dried at 100° C. in a non-circulating oven for 3 minutes and cured at 190° C. in an air circulating oven for 1-½ minutes to form a 101.6 microns (4 mil) thick film.

EXAMPLES III and IV

Examples of the invention were produced on an apparatus similar to that illustrated in the drawing. The replicative surface was provided by a chrome plated steel roll having a diameter of approximately 21.6 cm. (8-½ in.). The surface of the roll had an embossure effect provided by engraved cells ranging in depth from about 63.5 microns (2.5 mils) to about 101.6 microns (4 mils).

The paper substrate (which was similar to the paper substrate of Examples I and II) was unwound from a roll on an unwind stand, passed through the apparatus of the invention and rewound onto a roll. The radiation curable coating was applied to the underside of the paper at a coater like the pre-coater station 2 illustrated in the drawing and positioned about 2 meters upstream from the electron beam unit. Paper and coating were pressed against the replicative roll by a rubber covered roll, making intimate contact between the paper substrate, the coating, and the replicative roll and conforming the coating to the surface of the replicative roll. The paper, coating and replicative roll were rotated past an elctron beam radiation unit at a line speed of about 14 meters per minute, the coating was cured, and the paper and coating stripped from th roll in the manner illustrated in the drawing. The paper and coating stripped easily from the roll and the cured coating had good adhesion to the paper. The electron beam radiation unit was operated at 200 KV and the time between coating and curing was about 7 seconds.

In Example III, the coating composition consisted of equal parts by weight of trimethylolpropane triacrylate and isodecyl acrylate. The coating was cured at a dose of 5 megarads. Polyurethane resin and polyvinyl chloride plastisol were cast upon the coated product, dried and cured in the same manner as in Examples I and II, and were found to strip with stripping energy requirements of 43.3 $J./m.^2$ and 45.6 $J./m.^2$, respectively.

In Example IV, the coating composition consisted of 70 parts by weight of Dow Oligomer XD-9016, 11 parts by weight isodecyl acrylate, 12 parts by weight trimethylolpropane triacrylate, 5 parts by weight of a reactive carbinol functional silicone (Dow Corning Corp. 1248 silicone fluid), and 2 parts by weight of a carboxy reactive functional silicone (Dow Corning Corp. X2-7119). The coating was cured with a dose of 10 megarads. The same release tests performed on Example III were performed on Example IV and resulted in a stripping energy requirement of 17.6 $J./m.^2$ for the polyurethane and 30.4 $J./m.^2$ for the polyvinyl chloride.

The release papers of Examples III and IV were evaluated for degree of replication and found to be from 90% to 100%. The determination was made by tracing the profile of the surface of the release paper with a sensitive calibrated probe linked to a recorder. The profile dpeth ranged from approximately 63.5 microns (2.5 mils) to approximately 94 microns (3.7 mils).

In Examples III and IV, the coating was applied directly to the coated paper, which is a critical element of the invention because it permits sufficient time to pass between coating and curing in a continuous process to enable penetration of the coating into the base coated paper. Without it, the product might be useful for some applications, but not for release paper where stripping of a film or sheet formed on the release coating tends to remove an inadequately adhered release coating from its substrate. Examples I and II do not coat directly to the coated paper, but they represent only small samples produced in a manner which is not economically feasible for a commercial operation. Coating the electron beam coating first on the replicative surface, as done in Examples I and II, in a continuous operation like that of Examples III and IV would require very slow operating speeds since the coating station would by necessity be close to the curing unit. In addition it would be very difficult to prevent radiation from affecting the coating composition while still in the coater. This might be avoided to some extent by using very large replicative drums, but that additional expense is clearly disadvantageous.

EXAMPLES V-X

In order to obtain satisfactory attachment of the electron-beam cured coating composition to the paper substrate the air porosity of the paper must be at least about 3 cc./min./cm.$^2$. The following examples illustrate this requirement. Each was tested for air porosity by measuring the amount of cc. of air which passed through a 4 sq. cm. portion of them under a constant pressure of 10.3 kPa(1.5 p.s.i.). Example V was a continuous non porous film. Examples VI-IX were paper sheet base coated on one side only with conventional pigment-/binder coatings. Example X was an open sheet of paper coated by surface sizing on both sides. Other portions of each sample had been coated directly and electron-beam cured with a coating component having a viscosity of from 50 centipoise to 1300 centipoise and permitted from 3.5 to 9 seconds of dwell time between coating and curing.

| Example No. | Porosity | Attachment of Electron-Beam Coat to Material |
|---|---|---|
| V | 0 | non adherence |
| VI | 0.08 | poor |
| VII | 0.2 | good |
| VIII | 0.7 | good |
| IX | 2.5 | good |
| X | 310.0 | good, but excessive penetration which would require excessive coating weight to provide full surface replication. |

It is preferably that paper employed in the present invention not be too porous, less than 13,000 for example, since excessive coating weight would be required. This is normally avoided by using base coated paper with preferably at least 3 pounds of a conventional pigment-/binder coatings. In some cases less coating can be used and the base coating can be provided by surface sizing.

Having described the preferred embodiments of the invention, the scope of the invention is now set forth in the appended claims. Variations to preferred embodiments within the scope of the invention will be obvious to those skilled in the art.

What is claimed is:

1. A method of providing surface replication in a release coating on a substrate, comprising the steps of:

A. applying a coating of an electron beam radiation curable composition or material directly to one side of a web of base coated paper;
B. pressing the coated side of the substrate against a replicative surface having a desired surface effect to cause the surface of the coating to conform to the replicative surface;
C. irradiating the coating with electron beam radiation through the substrate to cure the coating at least sufficiently to enable it to be removed from the replicative surface securely attached to the substrate and with the replicated surface effect in the coating being maintained, the irradiation step taking place after sufficient time has passed to cause the coating to penetrate into the coated paper and to be in continuous intimate contact with the coated paper; and
D. stripping the substrate from the replicative surface with the at least partially cured coating adhered to the substrate.

2. The method according to claim 1, wherein the coated paper has an air porosity of at least about 0.08 cc./min./cm.$^2$ under an air pressure of about 10 kPa.

3. The method according to claim 2, wherein the coating is applied at a viscosity below 1300 centipoise.

4. The method according to claim 3, wherein at least one second passes from the application of the coating to the irradiation step.

5. The method according to claim 1, wherein the relicative surface is provided by an endless surface revolving past electron-beam radiation means.

6. The method according to claim 1, wherein the coating is only partially cured by Step C. and a further layer of the coating composition is applied to the surface of the partially cured coating and cured by electron-beam radiation without the outer coating surface contacting with any surface while completing the cure of the first applied coating.

7. The method according to claim 1, wherein the desired surface effect in the replicative surface is a contoured surface.

8. The method according to claim 7, wherein the engraved contoured surface is replicated in the coating, but not in the substrate.

9. The method according to claim 1, wherein the desired surface effect in the replicative surface is a smooth surface.

10. A release sheet comprising a paper web having on at least one side thereof a pigment/binder base coating and over that a coating of an electron beam radiation curable composition or material which has been cured by electron beam radiation passing first through the substrate, the other surface of the coating having a desired surface effect formed by curing the coating in intimate contact with a replicative surface having the desired surface effect and the coating having penetrated into the paper and being in continuous intimate contact with the coated paper.

11. The release sheet according to claim 10, wherein the base coated paper web had an air porosity of at least 0.08 cc./min./cm.$^2$ under an air pressure of 10 kPa before coating with the electron beam radiation curable composition.

12. The release sheet according to claim 10, wherein the surface effect is a contoured surface existing only in the coating and not in the substrate.

* * * * *

UNITED STATES PATENT AND TRADEMARK OFFICE
CERTIFICATE OF CORRECTION

PATENT NO. : 4,322,450
DATED : March 30, 1982
INVENTOR(S) : Lorin S. Gray III et al.

It is certified that error appears in the above-identified patent and that said Letters Patent is hereby corrected as shown below:

Column 9, line 22, the numeral "3" should read --0.08--; line 26, the numeral "10.3" should read --10--; line 52, the word "preferably" should read --preferable--; line 53, the numeral "13,000" should read --310--.

Signed and Sealed this

Twenty-third Day of January, 1990

Attest:

JEFFREY M. SAMUELS

Attesting Officer     Acting Commissioner of Patents and Trademarks